W. Devines,
Spice Sieve.
№ 52,693. Patented Feb. 20, 1866.
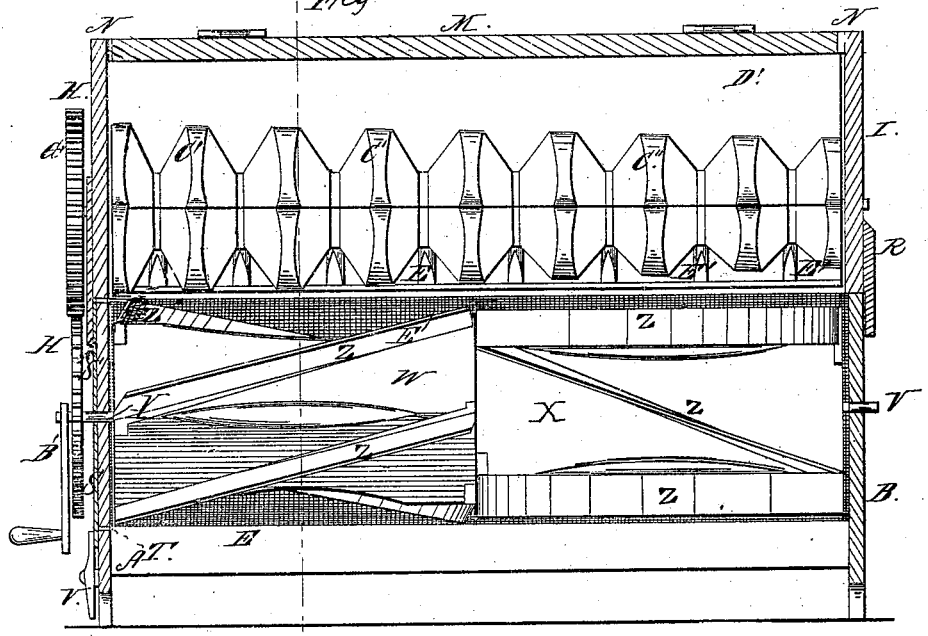
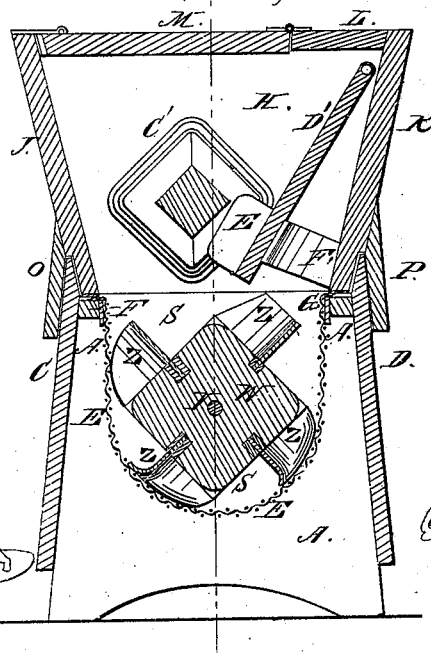
Witnesses
Inventor

UNITED STATES PATENT OFFICE.

WILLIAM DEVINES, OF BROOKLYN, NEW YORK.

DRUG AND SPICE SIFTER.

Specification forming part of Letters Patent No. 52,693, dated February 20, 1866.

*To all whom it may concern:*

Be it known that I, WILLIAM DEVINES, of Brooklyn, in the county of Kings and State of New York, have invented a new and useful Improvement in Sifters for Drugs, Spices, &c.; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved sifter through the line $x\,x$, Fig. 2. Fig. 2 is a vertical longitudinal section through the line $y\,y$, Fig. 1.

The object of my invention is to furnish a sifter by means of which powdered drugs, spices, &c., may be sifted readily and rapidly, and without waste or dust; and it consists in combining a shaft provided with elastic wings or flanges with the sieve, the box, and the hopper, and also in combining with the hopper an apparatus for crushing any lumps that may be in the material sifted before it can reach the sieve, as hereinafter more fully described.

A B C D is the box, in which is placed and to which is attached the sieve E. The ends A B and sides C D of said box may be vertical, but I prefer to make the sides C D inclined—that is, to make the box wider at the base than at the top, as this construction gives a more free passage for the descent of the sifted powder from the sieve E to the receptacle beneath.

Upon the sides C D are attached two pieces, F G, extending the entire length of the sifter, and to these is attached in any suitable manner the side edges of the sieve E, so as to bring the sieve E far enough away from the sides C D of the box to allow the entire surface of the sieve E to be made available for sifting purposes.

The ends A B terminate at the same height as the upper surfaces of the pieces F G, but the sides C D extend upward and have their inner edges beveled, as represented in Fig. 1, so as to fit into a cavity in the hopper, hereinafter described.

H I are the ends, J K the sides, and L M the lid or cover, of the hopper. The ends H and I are vertical, but the sides J and K are inclined in the manner of an ordinary hopper. The part M, which forms the lid of the cover, is hinged to the ends H and I and side K in the usual manner.

The front and end edges of the lid M are faced with strips N, of rubber or other packing, so as to form a close joint and prevent any escape of the finer particles of the material being sifted.

The lower edges of the sides J K and ends H I of the hopper rest upon the top of the ends A B of the box and the uppper surfaces of the pieces F G.

The lower part of the outside surfaces of the sides J K are beveled or channeled, as represented, so as to form a channel or groove into which the projecting beveled edges of the sides C D of the box may fit.

Upon the sides and ends of the hopper, near their lower edges, are attached pieces O P Q R, projecting downward below the edges of said hopper, so as to cover and protect the joint where the hopper and box come together and prevent all escape of dust from the sifter.

The upper part of the end A of the box is cut out in a circular form, so that the circular upper edge of said end A shall conform to the form of the sieve E, and the end edge of the sieve is attached to said circular edge in the usual way.

S is a door or cap, made to fit into the opening formed by cutting away the upper part of the end A of the box, and its circular edge is faced with strips T, of rubber or other packing, so as to secure a close joint between the cap S and the end A of the box. The outside surface of the cap S is covered with a metallic plate, U, projecting beyond the circular edge of the end A of the box, so as to overlap said circular edge, making the joint more secure, and at the same time furnishing a shoulder to prevent the cap S from being pushed in too far. This metal plate U may be replaced by a circular strip of metal or wood attached to the cap S and covering the said joint with substantially the same effect. The cap S is held in its place at its lower end by the button V, or its equivalent, and at the top of the overlapping piece Q, as shown.

W and X are square blocks or boxes attached to the shaft Y. These blocks are connected together end to end in such a way that the corners of the one shall be opposite the center of the side of the other, and are secured together by doweling or in some other suitable way. They are also channeled diagonally across their sides, as represented in the drawings, but the channels are inclined in a different direction in the two blocks, so that the wings Z, placed in said channels, shall tend to carry the material sifted toward the center of the sieve, collecting the waste or unsifted part at the center. In these channels are placed strips Z, of gutta-percha or other suitable elastic material, in a vertical position, as represented, and secured in place by wedges A', driven between the strips and the sides of the channels, one on each side of each strip, and driven from opposite ends of the channels. By this arrangement the strips Z may be easily removed from the channels, to be replaced with new ones, by simply removing the wedges A'. The corners of the blocks between the wings may be hollowed out, as represented, to allow more space for the material between the strips or wings Z. These strips should extend out so far from the blocks that they may overlap the sieve an eighth of an inch or more, according to the size of the sifter, as shown in Fig. 1. One end of the shaft Y works in bearings in the end B of the box, and the other end in bearings in the cap S.

To the projecting end of the shaft Y is attached a crank, B'; but when the machine is made large and driven by power the crank B' should be replaced by a pulley.

The shaft Y and its attachments may be removed from the sifter by removing the hopper and turning the button V, when the shaft and blocks may be withdrawn.

The cap S may be removed by first removing the crank B'.

C is a block extending the length of the hopper and revolving in bearings in the ends H and I of the hopper. The block C' is notched, as shown in the drawings, so as to form a cog-roller.

To the ends H and I, near their upper edges, is pivoted a plate, D', extending down a little lower than the roller C'. Upon the upper surface of the plate D' are attached wedge-shaped blocks or cogs E', in such positions that they may work into the notches formed in the roller C'. The blocks E' are made wedge-shaped in two directions—that is, in a direction parallel with the plane of the plate D' and in a direction perpendicular to said plane.

The plate D' is held away from the side K of the hopper and up against the roller C' by the spring F'.

The notched roller C' is not round but square, with the corners rounded off, so that as it is revolved an upward and downward motion is given to the plate D' by the projections or cogs of the roller pressing against the upper surface of said plate. Motion is communicated to the roller C' by the gear-wheel G', attached to the projecting end of the shaft that carries the said roller, which gear-wheel meshes into another one, H, attached to the shaft Y. By this arrangement any lumps that may be in the material to be sifted are crushed before reaching the sieve, and the operation of sifting made much more rapid and complete.

I claim as new and desire to secure by Letters Patent—

1. The combination of the blocks W and X with the sieve E, cap S, and box, substantially as described, and for the purpose set forth.

2. The combination of the roller C' with the plate D', blocks E', spring F', and with the hopper, substantially as described, and for the purpose set forth.

WM. DEVINES.

Witnesses:
M. M. LIVINGSTON,
JAMES T. GRAHAM.